(12) United States Patent
Ree et al.

(10) Patent No.: US 11,665,190 B2
(45) Date of Patent: *May 30, 2023

(54) SYSTEM TO RATE THE SECURITY OF A DEVICE THROUGH FINGERPRINT ANALYSIS

(71) Applicant: ioXt, LLC, Newport Beach, CA (US)

(72) Inventors: Brad Ree, Newport Beach, CA (US); Craig Trivelpiece, Lake Forest, CA (US)

(73) Assignee: IOXT, LLC, Costa Mesa, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 16/945,115

(22) Filed: Jul. 31, 2020

(65) Prior Publication Data

US 2021/0035697 A1 Feb. 4, 2021

Related U.S. Application Data

(60) Provisional application No. 62/881,870, filed on Aug. 1, 2019, provisional application No. 62/881,218, filed on Jul. 31, 2019.

(51) Int. Cl.
*H04L 9/40* (2022.01)
*G06F 1/28* (2006.01)
(Continued)

(52) U.S. Cl.
CPC ........... *H04L 63/1433* (2013.01); *G06F 1/28* (2013.01); *G06N 20/00* (2019.01); *G06V 40/50* (2022.01);
(Continued)

(58) Field of Classification Search
None
See application file for complete search history.

(56) References Cited

U.S. PATENT DOCUMENTS 9,336,030 B1 * 5/2016 Marr ..................... G06F 9/5077
11,256,802 B1 2/2022 Forcada et al.
(Continued)

OTHER PUBLICATIONS

Patent Cooperation Treaty, International Searching Authority, Notification of Transmittal of the International Search Report and the Written Opinion of the International Searching Authority, or the Declaration for PCT/US20/44600, dated Oct. 23, 2020.

*Primary Examiner* — Kevin T Bates
*Assistant Examiner* — Emad Siddiqi
(74) *Attorney, Agent, or Firm* — Vedder Price P.C.; Jordan A. Sigale

(57) ABSTRACT

An Internet of Things device is herein disclosed. The Internet of Things device comprises a communication module operable to connect to a network, a memory storing a device fingerprint having a plurality of predetermined system parameters, a processor coupled to the memory and operable to execute instructions stored in the memory, and an activity module, including at least one of a sensor and a control device, the activity module under control of the processor, to perform a predetermined operation with at least one of the sensor and the control device. The activity module communicates on the network via the communications module. The processor measures system parameters during performance of the predetermined operation, compares measured system parameters to predetermined system parameters of the device fingerprint, and disables the communications module, the processor, or the activity module responsive to the measured system parameters being out of compliance with the predetermined system parameters.

8 Claims, 3 Drawing Sheets

(51) Int. Cl.
    *G06N 20/00* (2019.01)
    *G16Y 30/10* (2020.01)
    *H04L 43/16* (2022.01)
    *G16Y 20/40* (2020.01)
    *G16Y 20/30* (2020.01)
    *G06V 40/50* (2022.01)
    *H04L 101/622* (2022.01)

(52) U.S. Cl.
    CPC ............... *G16Y 20/30* (2020.01); *G16Y 20/40* (2020.01); *G16Y 30/10* (2020.01); *H04L 43/16* (2013.01); *H04L 63/1416* (2013.01); *H04L 63/1425* (2013.01); *H04L 63/1458* (2013.01); *H04L 63/20* (2013.01); *H04L 2101/622* (2022.05)

(56) References Cited

U.S. PATENT DOCUMENTS

| | | | |
|---|---|---|---|
| 2019/0140933 A1* | 5/2019 | Guim Bernat | H04L 47/2425 |
| 2019/0163561 A1* | 5/2019 | Bradbury | G06F 11/1441 |
| 2020/0026852 A1 | 1/2020 | Sella et al. | |
| 2020/0106673 A1* | 4/2020 | Garrett, Jr. | H04L 41/0873 |
| 2020/0177485 A1 | 6/2020 | Shurtleff et al. | |

* cited by examiner

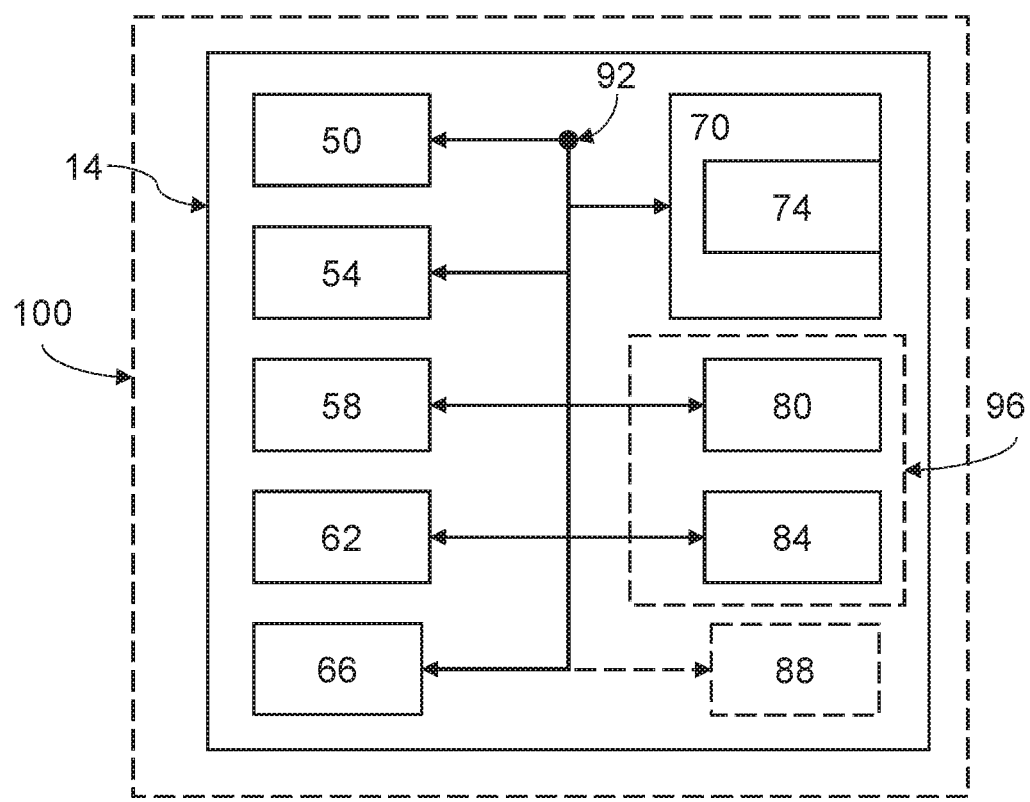
FIG. 2
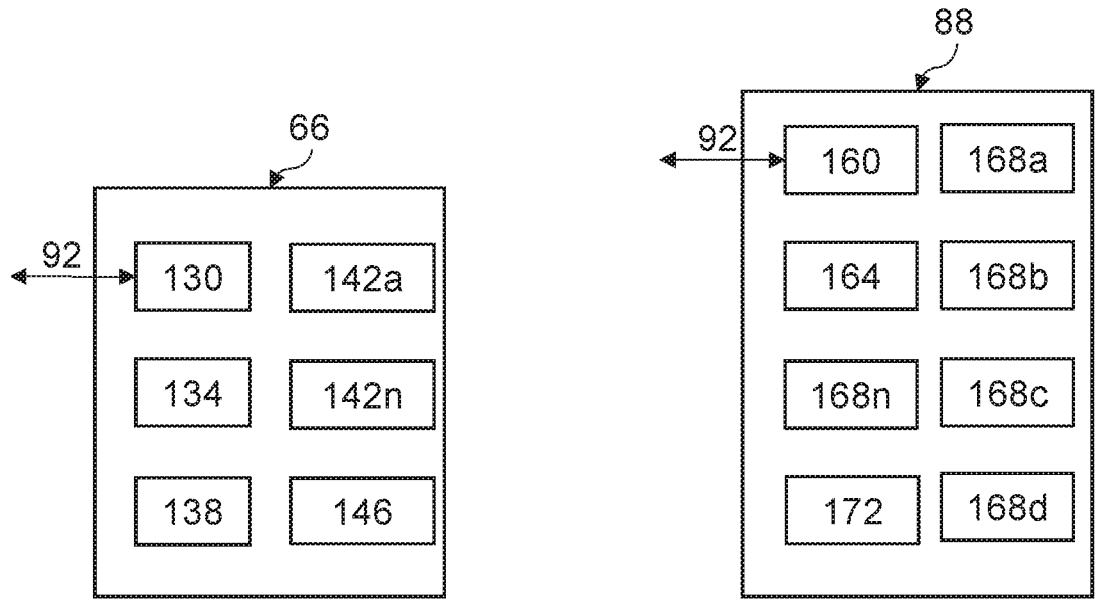
FIG. 3
FIG. 4

SYSTEM TO RATE THE SECURITY OF A DEVICE THROUGH FINGERPRINT ANALYSIS

INCORPORATION BY REFERENCE

The present patent application claims priority to Provisional Patent Application U.S. Ser. No. 62/881,218 titled "System and Method for BOT Attack Protection In IOT Devices", filed on Jul. 31, 2019, and Provisional Patent Application U.S. Ser. No. 62/881,870 entitled "SYSTEM AND METHOD FOR STOPPING BOTNET ATTACKS AT THE SOURCE", filed on Aug. 1, 2019, the entire contents of both applications are hereby expressly incorporated herein by reference.

BACKGROUND OF THE INVENTION

Field of the Invention

The present disclosure relates generally to network connected devices and, more particularly, to a system and method to prevent attacks against such devices.

Description of the Related Art

In recent times, a large number of devices have been connected to a network, such as the Internet. Often referred to as the Internet of Things devices (IoT devices), these devices include sensors, such as temperature sensors, pressure sensors, moisture sensors, light sensors, motion sensors, and the like. These sensors are Internet connected and remotely accessible. For example, a temperature sensor could monitor the temperature of a home, a refrigerator, or a freezer. The temperature can be remotely reported to a user's device, such as a mobile communication device (e.g., cellphone). Similarly, a moisture sensor can report water leaks, such as from a washing machine or water heater. A motion sensor can be used as part of a security system.

Other IoT devices are active devices, such as remote-controlled video monitors, temperature controllers, and the like. An active IoT device in an automobile permits the user to remotely start the automobile and warm up the engine or adjust the interior temperature. A common feature found in each IoT device is the ability to communicate over a network; however, communicating over a network has a potential shortcoming—the lack of security in IoT devices often leaves them vulnerable to attack by unscrupulous individuals.

Traditionally, most defenses against such attacks using IoT devices have been reactive instead of proactive. Reactive responses try to mitigate or control the damage, but do not prevent an attack from happening. Proactive solutions may include providing security on the IoT device to prevent hacking. Further in some locations, advanced security is needed to protect IoT devices, such as IoT devices in automobiles or relied upon in hospitals. As billions more IoT devices are deployed in the world the problem of insecure IoT devices and the risks associated with a failed device, either due to a hack, a software bug, or a hardware failure, is compounded.

What is needed is a solution that is a proactive defense against attacks. This present disclosure describes a system and method to proactively defend against attacks.

SUMMARY OF THE INVENTION

An Internet of Things device is herein disclosed. The problem of proactively defending against attacks is addressed by the Internet of Things device comprising a communication module operable to connect to a network, a memory storing a device fingerprint having a plurality of predetermined system parameters, a processor coupled to the memory and operable to execute instructions stored in the memory, and an activity module, including at least one of a sensor and a control device, the activity module under control of the processor, to perform a predetermined operation with at least one of the sensor and the control device. The activity module communicates on the network via the communications module. The processor measures system parameters during performance of the predetermined operation, compares measured system parameters to predetermined system parameters of the device fingerprint, and disables the communications module, the processor, or the activity module responsive to the measured system parameters being out of compliance with the predetermined system parameters.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 2 is a block diagram of an exemplary embodiment of an IoT device constructed in accordance with the present disclosure.

FIG. 3 is a functional block diagram of an exemplary embodiment of a power module constructed in accordance with the present disclosure.

FIG. 4 is a functional block diagram of an exemplary embodiment of a detection circuit constructed in accordance with the present disclosure.

DETAILED DESCRIPTION OF THE INVENTION

Figure 1:
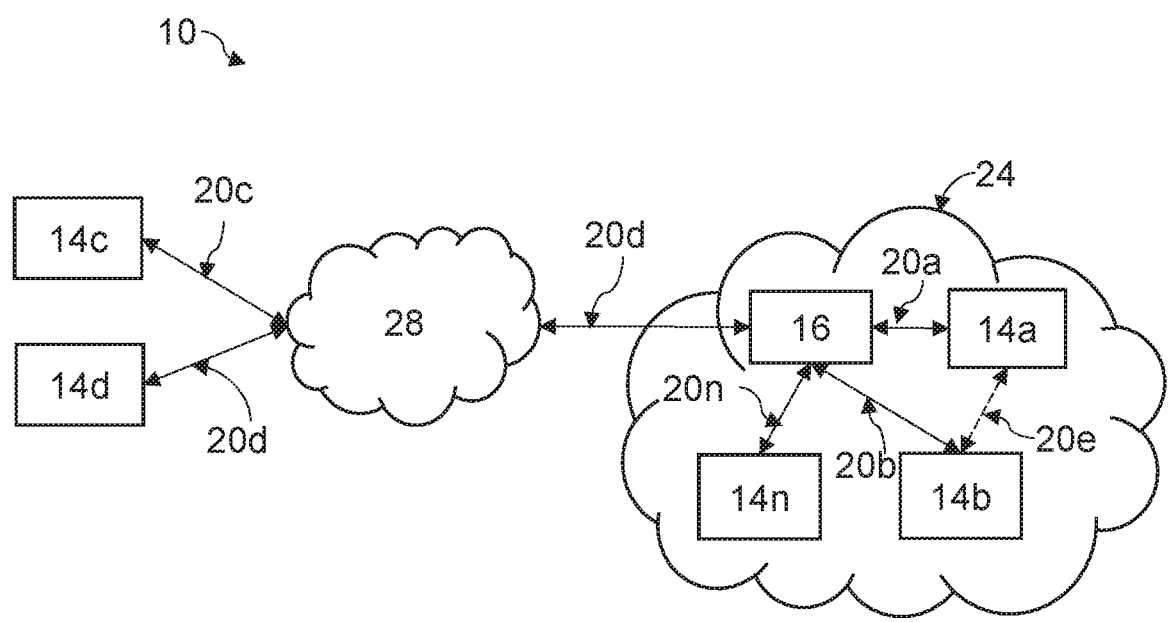
FIG. 1 is a diagram of an exemplary embodiment of an IoT network implemented in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted. The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, a "component" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

As used herein, an attack may include simultaneously directing network traffic to a target device, such as an IoT device, a specific website server or specific network infrastructure. Attacks may further include BOT Attacks, DDoS attacks, and target device hardware attacks, such as battery attacks, e.g., an attack to cause excessive power drain of the target device, or any other attack of a target device intending to affect usage of the target device in a manner inconsistent with the target device's normal operation and use.

Referring now to FIG. 1, shown therein is a diagram of an exemplary embodiment of an IoT network 10 generally comprising one or more IoT device 14a-n in communication with a controller 16 via one or more communication link 20a-n, a LAN 24, and a network 28. In one embodiment, IoT device 14a, IoT device 14b, and IoT device 14n are connected to the controller 16 by communication link 20a, communication link 20b, and communication link 20n respectively. The controller 16 may be, as shown in FIG. 1, within the LAN 24. The LAN 24 is in communication with the network 28 via a communication link 20d. In one embodiment, one or more IoT device 14a-n connects directly to the network 28 as depicted by IoT device 14c communicating with the network 28 via communication link 20c, and IoT device 14d communicating with the network 28 via communication link 20d. In this embodiment, the IoT device 14c and 14d may connect to the controller 16 via the network 28. In one embodiment, each of the one or more IoT device 14a-n may be in communication with at least one other IoT device 14a-n without being in communication with the controller 16 as represented in FIG. 1 with the IoT devices 14a and 14b communicating via the communication link 20e.

In one embodiment, the IoT network 10 is not limited to any particular type of IoT device 14a-n. The one or more IoT device 14a-n may be any IoT device 14, as depicted in FIG. 2 and described below in more detail.

In one embodiment, the controller 16 communicates with the one or more IoT device 14a-n via one or more communication link 20a-n. In one embodiment, where the controller 16 and the one or more IoT device 14a-n are in the LAN 24, the communication links 20a-n between the controller 16 and the one or more IoT device 14a-n do not connect to the network 28 and are implemented as LAN connections. In one embodiment, the controller 16 may be implemented as part of a personal computer, a laptop, a server, a mobile communication device (e.g., cell phone, PDA), a stand-alone device, and the like or some combination thereof. For the sake of simplicity, these various embodiments are illustrated as the controller 16. The controller 16 communicates with the network 28 via the communication link 20d. In one embodiment, the controller 16 enables communication between the one or more IoT device 14a-n within the LAN 24 to the network 28 via the communication link 20d.

In one embodiment, the controller 16 is implemented outside of the LAN 24 and is in communication with the network 28 via the communication link 20d. The one or more IoT device 14a-n may still be implemented in the LAN 24; however, the one or more IoT device 14a-n may connect to the controller 16 via the network 28.

As used herein, an ecosystem coordinator refers to an IoT device control system or IoT device organizing system that coordinates, organizes, and/or controls communications between the one or more IoT device 14a-n and the controller 16, a user, the network 28, and the LAN 24, or some combination thereof. In one embodiment, the ecosystem coordinator includes the controller 16 and, in some embodiments, includes the controller 16 integrated with a particular IoT device 14. Non-limiting examples of the ecosystem coordinator are Google Nest or Google Assistant (Google, LLC, Palo Alto, Calif.), Amazon Alexa (Amazon.com, Inc., Seattle, Wash.), and Insteon (Smartlabs, Inc., Irvine, Calif.). In one embodiment, the IoT network 10 includes more than one controller 16, for example, a first controller (not shown) is a component of the ecosystem coordinator and a second controller (not shown) is in communication with the ecosystem coordinator. In one embodiment, the IoT network 10 further includes one or more ecosystem coordinator.

In one embodiment, the network 28 may be any type of network and may be implemented by using one or more network topology and/or protocol, such as the World Wide Web (or Internet using a TCP/IP protocol), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, a short-range wireless network (such as a Zigbee network, an IEEE 802.15.4/802.15.5 network, Bluetooth network and/or the like), a wireless mesh network, a P2P network, an LPWAN network, a Z-wave network, and combinations thereof, and/or the like. It is conceivable that in the near future, embodiments of the present disclosure may use more advanced networking topologies and/or protocols. Each communication link 20*a-n* may be implemented based, at least in part, on the one or more protocol of the one or more network topology used to implement the network 28 and/or the LAN 24. Thus, the one or more communication link 20*a-n* is not dependent on a particular protocol, a particular network hardware, or a particular network topology. As depicted in FIG. 1, network infrastructure, such as wired and wireless connections to Internet service providers, routers, modems, gateways, switches, cellular infrastructure, and/or the like are omitted for the sake of clarity.

In one embodiment, the LAN 24 may be implemented similar to the implementation of the network 28. The controller 16 and one or more IoT device 14*a-n* connected to the LAN 24 may communicate with one another without connecting to the network 28, that is, the one or more communication link 20*a-n* within the LAN 24, such as the communication link 20*a* and the communication link 20*b*, do not traverse the network 28. In one embodiment, the communication link 20*a* and the communication link 20*b* do not directly connect to the network 28 when the network 28 is implemented as the internet, for example, but instead connect to the controller 16.

In one embodiment, the one or more communication link 20*a-n* depict a logical pathway for bidirectional communication between one or more component of the IoT network 10, that is, the one or more communication link 20*a-n* may enable communication between the one or more IoT device 14*a-n*, the controller 16, the LAN 24, and/or the network 28. By way of example only, if the controller 16 is a PC, the communication link 20*d* may be implemented as a conventional network connection, such as a wired or wireless connection to a network service provider, or, if the controller 16 is a mobile communication device, the communication link 20*d* may be implemented as a cellular communication link. The communication link 20*a-n* is not dependent on network topology used to implement the communication link 20*a-n*. In one embodiment, the communication link 20*d* may be implemented as a first network topology and the communication link 20*a* or the communication link 20*b* may be implemented as one or more second network topology. For example, the communication link 20*d* may be implemented using a TCP/IP protocol whereas the communication link 20*a* or the communication link 20*b* may be implemented as a Zigbee network.

Network traffic, as used herein, may include one or more network packet sent from a sending device (i.e., any device sending the network packet) and received by a receiving device (i.e., any device receiving the network packet) during an active network connection. The active network connection may be formed by the one or more communication link 20*a-n* between the sending device and the receiving device. A communication stream may include a substantially continuous transmission of network traffic from the sending device to the receiving device. Each network packet may include header information and data. The communication link 20*a-n* associated with each IoT device 14 enables the IoT device 14 to transmit data as a communication stream from the IoT device 14 to the controller 16, another IoT device 14*a-n*, and/or the network 28.

Referring now to FIG. 2, shown therein is a block diagram of an exemplary embodiment of the IoT device 14 constructed in accordance with the present disclosure. Generally, the IoT device 14 comprises a plurality of components including a processor 50, a memory 54, a timer 58, a user interface 62, a power module 66, a communications module 70 having one or more transceiver 74, a sensor 80, a control device 84, and a detection circuit 88, or some combination thereof. Each component is connected to one or more other component via a system bus 92. The sensor 80 and the control device 84 may be components of an activity module 96 as discussed below in more detail. The IoT device 14 also includes a housing 100 surrounding and containing the processor 50, the memory 54, the timer 58, the user interface 62, the power module 66, the communications module 70 having the transceiver 74, the sensor 80, the control device 84, and the detection circuit 88, or some combination thereof.

Each IoT device 14 is implemented as a combination of hardware and software. The software may be vulnerable to remote hacking that allows the hacker to control one or more aspect of the IoT device 14 and mount an attack as described above. Unintentional software bugs may cause malfunctions that can resemble an attack. To detect and prevent an attack, the hardware of the IoT device 14 detects and stops attacks, preferably outside of the control of the software application. In one embodiment, one or more component of the IoT device 14 may be implemented as a circuit on or within a particular chip such as a System On a Chip (SoC). In one embodiment, each IoT device 14 may include an IoT type. The IoT type is a categorization based on a function performed and/or an industry in which the IoT device 14 is used. Non-limiting examples of an IoT type may include: Appliance, Automotive, Garden, Home and Office, Lighting and Electrical, Multimedia, Security, Sensors and Controls, Wearables and Health, and Wi-Fi and Networking, or some combination thereof. The IoT type may be further classified into subtypes of each type. One non-limiting example may include an IoT device 14 having an IoT type of "Appliance" being further classified into one or more of HVAC, home appliance, and/or industrial grade appliance. Subtype examples have only been provided for the IoT type of Appliance for the sake of clarity and simplicity; it is understood that each IoT type may include one or more subtype associated with the IoT type.

In one embodiment, the IoT device 14 may include one or more detection circuit 88. As shown in FIG. 2, the detection circuit 88 is coupled to the system bus 92 by a dashed line. This is intended to indicate that the detection circuit 88 may be integrated with the processor 50, the memory 54, the power module 66, the sensor 80, the control device 88, the communications module 70 and/or the transceiver 77, or, the detection circuit 88 may be separate from the processor 50, the memory 54, the power module 66, the sensor 80, the control device 84, the communications module 70 and/or the transceiver 74 and not connected via every bus of the system bus 92. In another embodiment, the detection circuit 88 is coupled to one or more component of the IoT device 14 but may not be coupled to one or more other component of the IoT device 14. The detection circuit 88 is shown in FIG. 4 and discussed in more detail below.

In one embodiment, the IoT device 14 may include one or more processor 50 in communication with one or more component of the IoT device 14, such as, but not limited to, the memory 54, the timer 58, the user interface 62, the power module 66, the communications module 70 having the transceiver 74, the sensor 80, the control device 84, and the detection circuit 88, or some combination thereof via the system bus 92. The processor 50 may be implemented as a conventional microprocessor, application specific integrated circuit (ASIC), digital signal processor (DSP), programmable gate array (PGA), field programmable gate array (FPGA), and/or the like. Alternatively, the processor 50 may be replaced by individual electrical circuit components depending on the complexity of the IoT device 14. The IoT device 14 is not limited by a specific form of the processor 50. Additionally, the processor 50 may refer to a single processor 50 or multiple processors 50 working independently or together to collectively perform a task. The processor 50 may include one or more core operating at a particular frequency. Each of the one or more code may be in communication with another core or may be operating in isolation from another core.

In one embodiment, the memory 54 is one or more non-transitory computer readable medium storing computer executable logic, such as computer executable instructions, and data to control the operation of the processor 50 and/or another component of the IoT device 14. The memory 54 may include random access memory (RAM), read-only memory (ROM), programmable memory, flash memory, and the like, or some combination thereof. The memory 54 may be electrically based, optically based, magnetically based, and/or the like. The IoT device 14 is not limited by a specific form of hardware used to implement the memory 54. The memory 54 may also be integrally formed in whole or in part with the processor 54.

In one embodiment, the timer 58 generates a time signal indicative of an increment of time and/or a current time. In one embodiment, the timer 58 receives a timer start signal and, upon receiving a timer stop signal, generates a time signal indicative of an elapsed time. In one embodiment, the timer 58 is integrated within one or more other component of the IoT device 14, such as the processor 50; however, in an alternative embodiment, the timer 58 is implemented as circuitry separate from one or more component of the IoT device 14, but in communication via the system bus 92. In one embodiment, the timer 58 transmits the time signal on a time bus of the system bus 92. In another embodiment, the timer 58 may comprise a set of computer executable instructions that when executed by the processor 50 cause the processor 50 to implement the timer 58.

The IoT device 14 may include the user interface 62. In one embodiment, the user interface 62 may include an indicator to provide visual information to a user. For example, the user interface 62 may be one or more LED. The one or more LED, when lighted, may indicate an IoT device status to the user. In another embodiment, the user interface 62 includes one or more buttons configured to receive a user input from the user where the user input may be processed by the processor 50. In yet another embodiment, the user interface 62 may be a display such as, for example, an LED screen, an OLED screen, an LCD screen, or similar component.

In one embodiment, the IoT device 14 also includes the communications module 70 associated with one or more transceiver 74. The communications module 70 may be implemented on circuitry or may be implemented by the processor 50. The communications module 70 controls the one or more transceiver 74 of the IoT device 14 and operates the one or more transceiver 74 to send and/or receive network transmissions. The communications module 70 may provide connectivity between the IoT device 14 and the controller 16. The communications module 70 may establish two-way communication with the controller 16 via the one or more transceiver 70. For example, the IoT device 14*b* may be in communication with the controller 16 via communication link 20*b* and may be in communication with IoT device 14*a* via a communication link 20*e*. The communications module 70 of IoT device 14*b* may establish the communication link 20*b* using a first transceiver 74, which may be implemented, for example, conforming to the requirements of a WiFi protocol and the communications module 70 of the IoT device 14*b* may establish the communication link 20*e* using a second transceiver 74, which may be implemented, for example, conforming to the requirements of a Bluetooth protocol. In one embodiment, each of the one or more transceiver 74 may be implemented as hardware capable of establishing one or more communication link 20*a-n*. In one embodiment, a particular transceiver 74 may establish more than one communication link 20*a-n*. One non-limiting example may include the particular transceiver 74 establishing two or more communication links 20*a-n* via a particular network topology and/or protocol, e.g., the particular transceiver 74 may establish two or more WiFi protocol connections. It should be understood that use of the communications module 70 and the one or more transceiver 74 consumes a significant amount of power of the IoT device 14 as compared to other components of the IoT device 14. When transmitting, power consumption by the communications module 70 and the one or more transceivers 74 is greater than when not transmitting.

Each IoT device 14*a-n* may include the sensor 80 and/or the control device 84. In one embodiment, non-limiting examples of the sensor 80 may include: a temperature sensor, a pressure sensor, a moisture sensor, a light sensor, a motion sensor, an environmental sensor, a gravity sensor, a magnetometer, an air quality sensor, a humidity sensor, a barometer, an accelerometer, a gyroscope, an infrared sensor, a Hall sensor, a pulse sensor, an audio sensor, an voltage and/or amperage sensor, a touch sensor, a tilt sensor, an ultrasonic sensor, a vibrations sensor, a water level sensor, a gas sensor, a wireless emissions sensor, a hygrometer, a motion sensor, a video camera, and the like, or some combination thereof.

Similarly, each IoT device 14*a-n* may include the control device 84. The control device 84 may include any device to which the user may issue a command signal to operate the device. Non-limiting examples of the control device 84 may include, a remote-controlled video camera (e.g., a PTZ security camera where the user may issue a command signal to adjust the pan, tilt, and/or zoom of the camera), a temperature controller (e.g., a thermostat where the user may issue a command signal to adjust a target temperature range), an alarm (e.g., a security system where the user may issue a command signal to disable or enable the alarm) and the like or some combination thereof. One or more IoT device 14*a-n* may include both the sensor 80 and the control device 84. In one embodiment, the IoT device 14 may include one or more sensor 80 and/or one or more control device 84.

In one embodiment, the sensor 80 and the control device 84 may be referred to, collectively, as the activity module 96. The IoT device 14 may include one or more activity module 96, each activity module 96 including one or more sensor 80 and/or one or more control device 84. The activity module 96 may be configured to perform a predetermined operation with the sensor 80 and the control device 84. One non-limiting example of the activity module 96 is a thermostat having a sensor 80 as a temperature sensor and a control device 84 receiving a command signal to set a temperature range and issuing a control signal to execute the command signal, e.g., enabling or disabling an air conditioning unit. In one embodiment, the activity module 96 may further be configured to operate the communications module 70, e.g., cause the communications module 70 to transmit via a communication link 20 one or more communication to the controller 16. The activity module 96 is said to be active when the activity module 96 operates the communications module 70 and is said to be inactive when the activity module 96 does not operate the communications module 70.

In one embodiment, components of the IoT device 14 are coupled together by the system bus 92. The system bus 92 may include an address bus, a data bus, a control bus, a power bus, a time bus, and/or the like. For the sake of convenience, the various busses are illustrated as the system bus 92.

In one embodiment, the IoT device 14 includes the power module 66. Referring now to FIG. 3, shown therein is a block diagram of an exemplary embodiment of the power module 66 constructed in accordance with the present disclosure. In one embodiment, the power module 66 is positioned within the housing 100 and includes a processor 130, a memory 134, a power supply 138, one or more control switch 142*a-n*, and regulating circuitry. The processor 130 may be constructed in a manner similar to the processor 50. The memory 134 may be constructed in a manner similar to the memory 54.

The details of the implementation of the power module 66 depend on the specific design of the IoT device 14. For example, the power supply 66 may be a battery or a battery with voltage and/or current regulating circuitry 146. In another embodiment, the power supply 66 may be a port configured to receive a power from an external source, such as, from an electrical receptacle. In that embodiment, the power supply 66 may also include an AC plug configured to supply power from the electrical receptable and may also include a modular power supply, such as commonly used with cellular telephones. The power supply 66 in this embodiment includes a voltage transformer as well as voltage and/or current regulator circuitry 146 that may be external to the housing 100. In either embodiment, the power module 66 has circuitry to supply power to the processor 50, the memory 54, the sensor 80, the control device 84, the communications module 70, the one or more transceiver 74, and the detection circuit 88. Where the power is supplied from a source external from the housing 100 of the IoT device 14, the power module 66 may be referred to as an external power module. Similarly, a power module 66 having circuitry to supply power from a source (e.g., battery) internal to the housing 100 of the IoT device 14 may be referred to as an internal power module.

In one embodiment, the power module 66 includes one or more control switch 142*a-n* connected to a power bus of the system bus 92. Each of the one or more control switch 14*a-n* may be logically connected to the processor 130 thereby enabling the processor 130 to cause one or more of the control switch 142*a-n* to enable or disable a power connection of the power bus between the power module 66 and other components of the IoT device 14. In this way, the processor 130 of the power module 66 may enable a particular component of the IoT device 14 or disable a particular component of the IoT device 14 by enabling or disabling the power connection associated with the particular component. In one embodiment, each of the one or more control switch 142*a-n* may be connected to a control bus, thereby enabling another component of the IoT device 14, e.g., the detection circuit 88, to enable or disable the power connection of the power bus.

In one embodiment, the one or more control switch 142*a-n* includes a power monitor (e.g., ammeter and/or voltmeter) to measure a current, and/or a voltage supplied by the power module 66 to each component of the IoT device 14. Signals indicative of the current and/or voltage may be supplied to the processor 130, which may compute an amount of power supplied by the power module 66 to each component of the IoT device 14, or an aggregate power supplied by the power module 66 to two or more components of the IoT device 14. In one embodiment, the processor 130 may determine the power supplied by the power module 66 by measuring the power monitor of each control switch 142 and storing each power supplied in the memory 134. In one embodiment, the processor 130 is connected to the bus system 92. In such an embodiment, the processor 130 may send one or more power data to another component of the IoT device 14. The power data may include a voltage supplied, a current supplied, and a duration for supplying the voltage and the current, or some combination thereof. The processor 130 may send a disable signal to one or more of the control switches 142*a-n* to disable a particular one or more component of the IoT device 14 by enabling or disabling the power connection of the power bus between the power module 66 and the particular one or more component of the IoT device 14.

In one embodiment, the regulating circuitry 146 may regulate a power or voltage supplied by the power source 134 to normalize the power or voltage such that the components of the IoT device 14 may be supplied with adequate power to enable each component to function. In one embodiment, the regulating circuitry 146 may include one or more sensor. For example, if the sensor is temperature probe, the temperature probe may measure a temperature of the processor 130, the memory 134, the power supply 134, the one or more control switch 142*a-n*, and the regulating circuitry 146, or some combination thereof. In one embodiment, the processor 130 may read the temperature of the processor 130, the memory 134, the power supply 138, the one or more control switch 142*a-n*, or the regulating circuitry 146 and record the temperature in the memory 134. The processor 130 may send one or more power module data to another component of the IoT device 14. The power module data may include a temperature for one or more of the processor 130, the memory 134, the power supply 138, the one or more control switch 142*a-n*, and the regulating circuitry 146. If the power and/or temperature exceeds a temperature threshold, the processor 130 may send a disable signal to one or more of the control switches 142*a-n* to disable the power connection of one or more component of the IoT device 14 thus disabling the IoT device 14.

Referring now to FIG. 4, shown therein is a block diagram of an exemplary embodiment of the detection circuit 88. Generally, the detection circuit 88 is positioned within the housing 100 and may include a processor 160, a memory 164 and one or more detectors 168a-n. The processor 160 may be constructed similar to the processor 50 and is connected to the data bus and/or the control bus of the system bus 92. The memory 164 may be similar to the memory 54 discussed above. The memory 164 may not be connected to the system bus 92 thereby maintaining isolation between the detection circuit 88 and software stored in the memory 54 and being executed by the processor 50.

In one embodiment, the one or more detector 168a-n includes a sensor configured to determine at least one system parameter of the IoT device 14, for example, a temperature sensor 168a to determine a temperature system parameter of one or more component of the IoT device 14, a power sensor 168b to determine a power consumption parameter of one or more component of the IoT device 14, a photodetector 168c configured to determine a light produced parameter of one or more component of the IoT device 14, and a bus monitor 168d configured to determine a use parameter of one or more bus or control line of the system bus 92. The one or more detector 168a-n is not limited to the above examples and may be any other detector designed or configured to determine a system parameter of the IoT device 14. In one embodiment, the one or more detector 168a-n may include a radio wave sensor configured to determine whether a particular transceiver 74 is active, that is, whether the particular transceiver 74 is transmitting or receiving data.

Each of the one or more detector 168a-n may be logically connected to the processor 160 thereby enabling the processor 160 to measure the system parameter determined by each detector 168a-n. In one embodiment, the processor 160 may measure each system parameter determined by each detector 168a-n and store each system parameter in the memory 164. In one embodiment, the processor 50, in communication with the processor 160, can access the one or more detector 168a-n.

In one embodiment, the processor 160 is connected to the system bus 92. In such an embodiment, the processor 160 may receive one or more system parameter from each component of the IoT device 14, for example but not limited to, the power data from the power module 66. The processor 160 may also be logically connected to the system bus 92, and more specifically to the control bus, thereby enabling the processor 160 to send one or more control signal to each component of the IoT device 14. In one embodiment, the one or more control signal may include a deactivate command or a power-off command. In another embodiment, the one or more control signal is sent to the power module 66 causing the power module 66 to disable power to a particular one or more component of the IoT device 14.

In one embodiment, the detection circuit 88 includes a power source 172. The power source 172 may be connected directly to the power module 66, thus providing a power to the detection circuit 88 without using the power bus of the system bus 92. In one embodiment, the power source 172 is independent from the power module 66, e.g., a dedicated battery. In yet another embodiment, the power source 172 may be connected to one of the power bus of the system bus 92, directly connected to the power module 66, or independent of the power module 66, or some combination thereof.

In one embodiment, the detection circuit 88 detects abnormal operation of the IoT device 14 by using one or more direct detection techniques, indirect detection technique, or combination thereof. A direct detection technique may include a technique that directly examines data sent by the IoT device 14, e.g., a detection technique that reads header information in one or more data packet. An indirect detection technique, however, measures a plurality of measured system parameters of a particular one or more component of the IoT device 14 against a plurality of predetermined system parameters of a device fingerprint. One example of an indirect detection technique is side-channel analysis. As used herein, side-channel analysis is a non-invasive approach using an indirect technique to continuously and in real-time measure system parameters of the IoT device 14 and compare the measured system parameters with the predetermined parameters of the device fingerprint. The measured system parameters are secondary indicators that a predetermined operation is being properly taken. If multiple measured system parameters are out of compliance with the predetermined system parameters, then the IoT device is disabled as described herein.

In one embodiment, a device profile is stored in the memory 164 of the detection circuit 88. The device profile includes a plurality of device fingerprints that are indicative of normal operation and/or predetermined requirements for operating/making the IoT device 14. Side-channel analysis is used to monitor at least one and preferably multiple system parameters. Exemplary system parameters monitored by side-channel analysis may include a processing time parameter, a power consumption parameter, a radio emissions parameter, a system bus access parameter, and the like or some combination thereof. The measured system parameter is compared to a predetermined system parameter that may be stored in the memory 164, for example. The memory 164 may store a plurality of predetermined system parameters that may be supplied by the developer and/or the manufacturer of the IoT device 14 as being representative of proper system parameters of predetermined operations for the IoT device 14. By periodically measuring the system parameters of the IoT device, and comparing the measured system parameters against the predetermined system parameters during or after the occurrence of a predetermined operation, the processor 160 can determine whether or not the component(s) (e.g., processor 50, memory 54, sensor 80 or control device 84, for example) of the IoT device 14 are functioning properly. If the component(s) are functioning properly, then no further action may be taken by the processor 160, other than measuring the system parameters during a subsequent period when the predetermined operation is occurring or has occurred. If the component(s) are not functioning properly, then the processor 160 may disable the IoT device 14 as explained in more detail herein.

In one embodiment, the processing time parameter may indicate a time indicative of a duration of processing time for the predetermined operation, such as a key negotiation. In this example, the processing time parameter is referred to as a key negotiation processing time parameter. The detection circuit 88 may determine the key negotiation processing time parameter by measuring a time involved during a key negotiation, e.g., a number of clock-cycles of the processor 50 or a time from the timer 58, for a period of time during which the key negotiation is executed using either a hardware-based security engine or a software-based security engine.

In one embodiment, the power consumption parameter indicates a power consumed by the processor 50, or other component of the IoT device 14, during a predetermined operation. For example, when the predetermined operation is a cryptographic operation, a cryptographic operation power consumption parameter may be determined by measuring the power sensor 168b associated with the processor 50 or power sensor 168 associated with another component of the IoT device 14. In one embodiment, the cryptographic power consumption parameter is more applicable when the IoT device takes similar steps in a similar order when executing a cryptographic operation. In one embodiment, the detection circuit 88, in order to measure the power consumed by the processor 50, or other component of the IoT device 14, may communicate with the power module 66 to receive a power data indicative of the power consumed by the processor 50, or other component of the IoT device 14.

In one embodiment, the radio emissions parameter may include one or more parameter relating to what, if any, radio emissions are generated by a memory component, e.g. memory 54 when accessed via the bus system 92. The radio emissions parameter may be more applicable when the IoT device 14 takes specific steps in a consistent order when a particular operation is executed. For example, the detection circuit 88 may include one or more detector 168 to measure radio emissions for each memory component of the IoT device 14. In one embodiment, the radio emissions parameter further includes an operation type parameter determined by the processor 50. To determine the operation type parameter, the detection circuit 88 with the detector 168 may measure radio emissions of each memory module to determine whether a particular operation has been executed, e.g., whether a read or write operation has been performed on the memory 54 or other memory component.

In one embodiment, the system bus access parameter includes one or more access bus data such as an access pattern of the system bus 92 between one or more of the processor 50, the transceiver 74, the memory 54, the power module 66, the timer 58, the communications module 70, the sensor 80, and/or the control device 84, or some combination thereof, for any particular operation performed by the IoT device 14. Each access pattern may include information regarding the one or more component accessing the system bus 92 as well as metadata about the access such as, for example, whether the access is a read/write access, an address location of the access, or the like. For example, the access pattern for a temperature reading operation, e.g., of a thermostat device, may include the pattern: the processor 50 accesses the sensor 80, stores a reading to the memory 54, then transmits the reading using the communications module 70 and metadata regarding access times between each component and access order between each component. The detection circuit 88 may monitor a particular temperature reading operation, e.g., with the bus monitor 168*d*, to determine an order of access and a duration of access between each component of the IoT device 14 as the system bus access parameter.

The device fingerprint can be made by performing a predetermined operation by at least one component (e.g., the processor 50, the memory 54, the timer 58, the user interface 62, the power module 66, the communications module 70 having the one or more transceiver 74, the sensor 80, the control device 84, or the detection circuit 88) of the Internet of Things device 14. A plurality of system parameters of the at least one component are measured by the detection circuit 88 during or after the occurrence of the predetermined operation to generate measured system parameters. The measured system parameters are stored as a device fingerprint in a non-transitory memory, such as the memory 54, associated with a predetermined operation identifier (e.g., a numeric code, an alpha code, or an alphanumeric code) identifying the predetermined operation.

As used herein, the device fingerprint comprises one or more operational setting and/or one or more threshold of any system parameter of the IoT device 14. Each of the one or more threshold and one or more operational setting may be categorized into a fingerprint layer, such as a silicon layer, a developer layer, and/or a normalized layer. The device fingerprint may include one or more operational setting not organized into a fingerprint layer, for example, the device fingerprint may include an operations setting identifying the IoT type and/or IoT subtype of the IoT device 14.

In one embodiment, the silicon layer comprises, for example, one or more operational setting and/or one or more threshold determined or provided by a manufacturer of one or more circuitry of a particular component. Each threshold provided by the circuitry manufacturer may be based on an expected parameter of the circuitry known to the manufacturer. For example, a manufacturer of a particular transceiver 74 may provide one or more threshold, such as, a power consumption threshold based on a power consumed parameter, an operating temperature threshold based on an operating temperature parameter, or other threshold based on a measurable parameter relating to operation of the particular transceiver 74.

In one embodiment, the developer layer comprises, for example, one or more operational setting and/or one or more threshold from the developer of the IoT device 14 (developer) and organized into one or more operation type. For example, the developer layer may be further organized into one or more operation types, including a secure boot operation, a session key negotiation operation, a packet handling operation, a power state operation, a physical event operation, and a tamper detection operation, for example. Each operation type includes one or more operational setting and/or threshold providing expected thresholds or settings of system parameters. In one embodiment, each operation type may be associated with a triggering event as described in more detail below. The developer layer may be considered a "known good" reference.

In one embodiment, the secure boot operation includes a code signature setting, a code validation threshold, a software encryption setting, a software decryption time threshold, and a boot jump vector memory location setting, or some combination thereof, for example. The code signature setting may include a signature of the software stored in the memory 54. The code validation threshold may be an expected duration to validate the software stored in the memory 54 against the signature of the code signature setting. If the software is encrypted, the developer may include the software encryption setting and the software decryption time threshold in the secure boot operation. The software encryption setting may include an encryption information such as encryption algorithm and encryption strength. The software decryption time threshold may be an expected duration needed to decrypt the software stored in the memory 54 or may be a range of expected durations during which the software stored in the memory 54 is expected to be decrypted. The code validation threshold and the software decryption threshold may be associated with a time parameter as determined, e.g., by the timer 62.

In one embodiment, the session key negotiation operation includes a security engine setting and a key negotiation time threshold, for example. With the security engine setting, the developer may indicate whether a hardware-based security engine or a software-based security engine is used by the IoT device 14. Generally, the hardware-based security engine will execute more quickly than the software-based security engine. Most security engines will dither the power supply to mask operations being executed, whereas the software-based security engine, executing on the processor 50, will not include power dithering. The key negotiation time threshold may be a duration or range of durations during which proper key negotiation is expected to occur.

In one embodiment, the packet handling operation includes a packet decryption time threshold, a packet processing time threshold, a packet response generation time threshold, a response encryption time threshold, and a malformed packet response time threshold, for example. The packet decryption time threshold may be a duration or duration range during which the developer expects the IoT device 14 to decrypt a network packet. The packet processing time threshold may be a duration or duration range during which the developer expects the IoT device 14 to process the network packet. The packet response generation time threshold may be a duration or duration range during which the developer expects the IoT device 14 to generate a response to the network packet. The packet response encryption time threshold may be a duration or duration range during which the developer expects the IoT device 14 to encrypt a response to the network packet. The malformed packet response time threshold may be a duration or duration range during which the developer expects the IoT device 14 to respond to a malformed network packet.

In one embodiment, the power state operation includes a power-up time threshold and a wake-up time threshold. The power-up time threshold may be a duration or duration range for which the developer expects the IoT device 14 to power-up from a powered-off state. The wake-up time threshold may be a duration or duration range during which the developer expects the IoT device 14 to wake-up from a low-power state, hibernation state, or sleep state. The power-up time threshold and the wake-up time threshold may be associated with an activation time system parameter.

In one embodiment, the physical event operation includes an event response time threshold. The response time threshold may be an event response time duration or duration range during which the developer expects the IoT device 14 to response to a physical event. For example, the event response time duration may be a period of time between occurrence of a physical event and detection, by the sensor 80 designed to detect the physical event, of the physical event.

In one embodiment, the developer layer may further include one or more operational setting and/or the one or more threshold provided by the developer and, for example, may include one or more threshold associated with a power of one or more component of the IoT device 14, one or more threshold associated with an expected operation time of one or more component of the IoT device 14, and one or more operational parameter associated, for example, with whether a password is required to access the IoT device 14, whether the password required to access the IoT device 14 is encrypted, and/or whether the password required to access the IoT device 14 is changeable. In one embodiment, one or more operation setting and/or threshold of the developer layer is created while the developer develops or programs the IoT device 14, for example, using a software development kit (SDK).

In one embodiment, the normalized layer comprises one or more operational setting and/or one or more threshold as determined during normal operation of the IoT device 14. The normalized layer may be determined by an initial calibration sequence such as in machine learning mode in step 206 of U.S. patent application Ser. No. 16/944,822 entitled "System for Attack Protection in IOT Devices" filed Jul. 31, 2020, the entire contents of which are hereby incorporated in its entirety.

Figure 5:
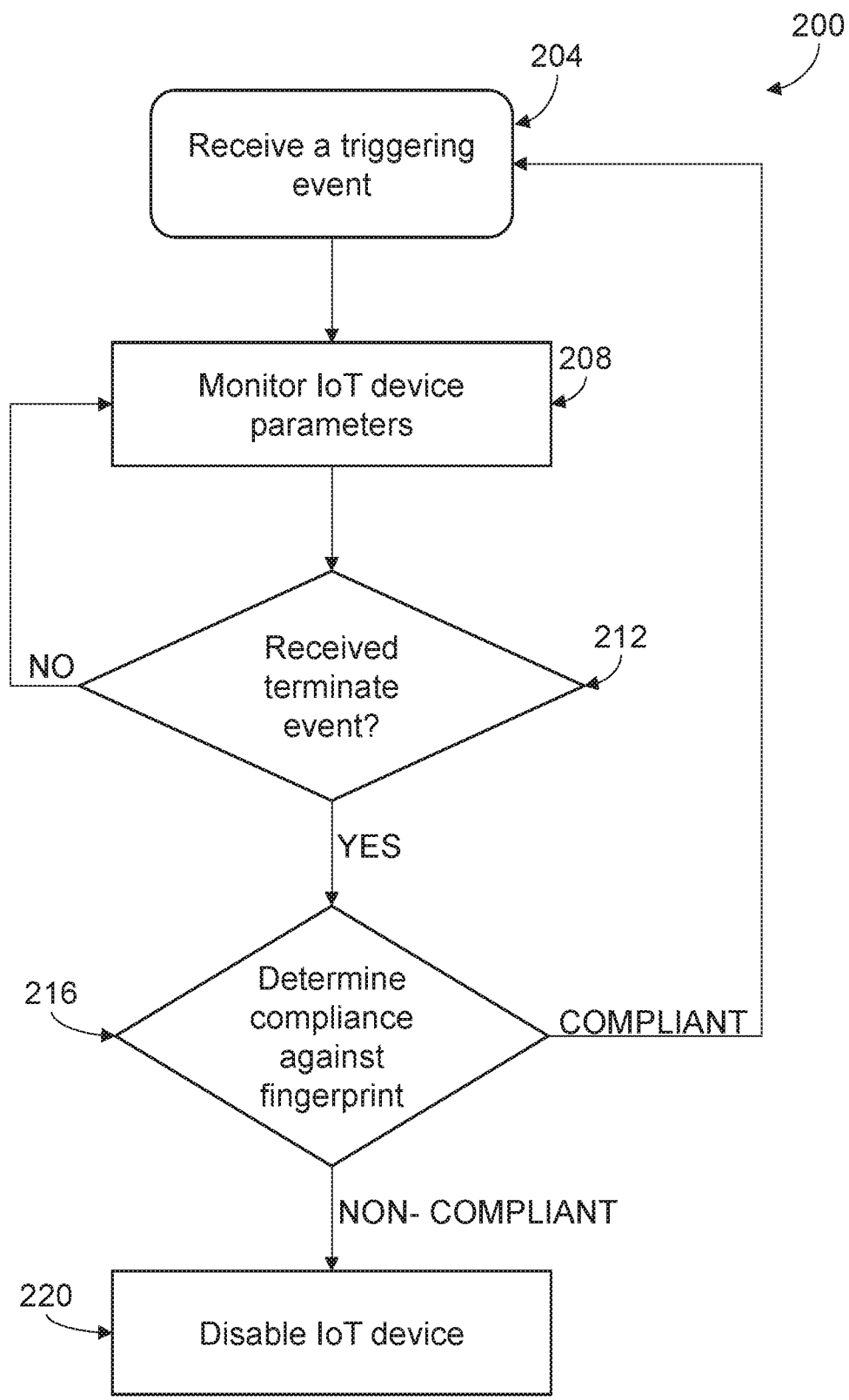
FIG. 5 is a flow diagram of an exemplary embodiment of an abnormal signal detection process.

Referring now to FIG. 5, shown therein is a flow diagram of an abnormal operation detection process 200 generally comprising the steps of: receiving a triggering event (step 204); monitoring one or more IoT device 14 system parameters (step 208); determining if a terminate event has been received (step 212); and, if the terminate trigger has not been received, returning to step 208, otherwise, determining compliance of the IoT device 14 with the device fingerprint (step 216), and disabling the IoT device 220 responsive to at least two measured system parameters being out of compliance with at least two predetermined system parameters of the device fingerprint (step 220). In one embodiment, the abnormal operation detection process 200 is performed by the processor 50, however, in other embodiments, the abnormal operation detection process 200 is performed by the processor 130 of the power module 66 or the processor 150 of the detection circuit 88, or some combination thereof. If the step 216 determines all of only one of the measured system parameters are in compliance with the predetermined system parameters, then the process 200 branches from the step 216 to the step 204 such that the abnormal operation detection process 200 repeats.

In one embodiment, receiving a triggering event (step 204) may include, for example, receiving the triggering event generated by another component of the IoT device 14 or receiving the triggering event from outside the IoT device 14, that is, the IoT device 14 may receive the triggering event from another IoT device 14, from the controller 16, from the ecosystem coordinator, or the like. The triggering event may have a triggering event type such as, for example only, a wake-up event, a power-on event, a communication event, or sensor event.

In one embodiment, the triggering event may be a wake-up event or a power-on event raised by the processor 50, or other another component, in response to the IoT device 14 waking up or powering on. The triggering event may also be raised from another device in communication with the IoT device 14 and that can cause the IoT device 14 to wake-up or power-on, such as a command from the ecosystem provider or from the controller 16.

In one embodiment, the triggering event is a communication event raised by the processor 50, the communications module 70, or another component of the IoT device 14. The communication event may be triggered when the communications module 70 receives a command to begin a transmission or may be raised when the communications module 70 activates a particular transceiver 74.

In one embodiment, the triggering event is a sensor event. The sensor event may be raised by the processor 50 in communication with the activity module 96 or the sensor 80. For example, if the sensor 80 is a motion sensor, the sensor event may be raised when the motion sensor detects motion. The sensor event may also be raised by the processor 130 of the power module 66 based in part on a measurement from one or more power monitor of the one or more control switch 142*a-n*. For example, if the processor 130 measuring the power monitor of a particular control switch 142 identifies a change in power consumption, the processor 130 may raise the sensor event. The sensor event may also be raised by the processor 160 of the detection circuit 88 based in part on a measurement of a system parameter detected by the one or more detectors 168*a-n*.

In one embodiment, monitoring one or more IoT device 14 system parameter (step 208) includes monitoring a particular one or more system parameter based at least in part on the type of triggering event. Each type of triggering event may be associated with one or more operational setting and/or threshold of the device fingerprint. In one embodiment, monitoring the particular system parameters may include measuring one or more system parameter and storing the measurement in memory. For example, the power-up event may be associated with a selection of thresholds or a particular one or more operation type provided in the device fingerprint such as the power-up time threshold of the power state operation and the secure boot operation. Thus, the power-up event may trigger monitoring the activation time system parameter because of an association between the power-up event and the power-up time threshold and may trigger monitoring the time parameter associated with the code validation time threshold and the software decryption time threshold if, based on the software encryption setting, the software is encrypted. The activation time system parameter and the time parameter may provide an amount of time since the IoT device 14 was powered on or may provide a timestamp of the power-on event. In one embodiment, when the type of triggering event is associated with one or more operational setting, step 216 may be started following step 208.

In one embodiment, determining if a termination event has been received (step 212) includes receiving a termination event and stopping monitoring one or more IoT device 14 system parameter (step 208). The termination event may be, for example, a time termination event, a network termination event, an external termination event, or any other event operable to terminate monitoring one or more system parameter. For example, if the time parameter associated with the secure boot operation of the device fingerprint is being measured, a timer termination event may be raised after a set period of time to stop further measurement of the time parameter or, after a set period of time, a second timestamp is recorded. Similarly, if the if the activation time system parameter is being measured, the timer termination event may be raised to stop further measurement of the time parameter or, after a set period of time, a second timestamp is recorded.

In one embodiment, determining compliance of the IoT device 14 with the device fingerprint (step 216) includes comparing the particular one or more system parameter monitored in step 208 against the device fingerprint and, if the particular one or more system parameter fails to meet a threshold of the fingerprint, raising a failed compliance event indicating the failed threshold. The processor 160 of the detection circuit 88, or other processor component, handles the failed compliance event based on the failed threshold. In one embodiment, the processor 160, handling the failed threshold, may send a disable signal to the power module 66 causing the processor 130 to disable one or more power connection, may send a power cycle command to the power module 66 causing the processor 130 to power cycle the IoT device 14, may send a disable command to the communications module 70 causing either the communications module 70 or the transceiver 74, or both, to become disabled, and may send a notification to the user indicating the failed compliance event has occurred and, in some embodiments, further indicating the failed threshold, or some combination thereof.

In the example above of the trigger event being the power-up event, a power-up duration may be determined by the measurement of the time parameter or by the difference between the second time and the first time. The power-up duration is compared against, for example, the developer layer software decryption time threshold. If the power-up duration is outside the software decryption time threshold, a failed compliance event indicating the developer layer software decryption time threshold may be raised. Similarly, the power-up duration may be compared against the code validation time threshold, if the power-up duration is outside the code validation time threshold, the failed compliance event indicating the code validation time threshold may be raised.

One non-limiting example of the abnormal operation process 200 includes an IoT device 14 as a thermostat device, where the thermostat device may include at least one temperature sensor 80 and at least one control device 84 to control an HVAC device. The device fingerprint for the thermostat device may include a silicon layer, a developer layer, and a normalized layer. The developer layer may include a transceiver temperature threshold indicative of an expected maximum temperature of the transceiver 74, an active transceiver time threshold indicative of a time range during which the transceiver 74 is active during normal operations, a transceiver power threshold indicative of a power consumed while operating the transceiver 74, a processor temperature threshold indicative of an expected maximum temperature of the processor 50, an inactive power consumption threshold indicative of a power consumed while the IoT device 14 is inactive, an active power consumption threshold indicative of a power consumed while the IoT device 14 is active, a control device operating power threshold indicative of a power consumed while operating the control device 84, a control device time threshold indicative of a time range during which the control device 84 is controlled, a sensor operating power threshold indicative of a power consumed while operating the temperature sensor, and a sensor time threshold indicative of a tame range during which the temperature sensor is active, for example. During normal operation of the thermostat device, the thermostat device may periodically check a temperature of the room, transmit the temperature, e.g., to the controller, and, depending on the temperature, control the HVAC device. Each time the thermostat device checks the temperature, a sensor event is raised, resulting in a monitor operation of a sensor power parameter resulting in a sensor power consumed and a sensor operation time parameter resulting in a sensor operation duration. Once the temperature is determined by the sensor, a termination event is raised for the monitor operation, and the sensor power consumed is compared against the sensor operating power threshold and any threshold of the silicon layer or normalized layer associated with the sensor power parameter, and the sensor operation duration is compared against the sensor time threshold and any threshold of the silicon layer or normalized layer associated with the Sensor operation time parameter. If either the sensor power consumed or the sensor operation duration exceeds the respective threshold, a failed compliance event indicating the failed threshold is raised. Similarly, each time the thermostat device transmits the temperature, a communication event may be raised, resulting in a monitor operation of a transceiver temperature parameter resulting in a transceiver temperature, a transceiver power parameter resulting in a transceiver power consumed, and a transceiver time parameter resulting in a transceiver active duration. Once the temperature transmission has been completed, a termination event is raised for the monitor operation, and the transceiver temperature is compared against the transceiver temperature threshold, the transceiver power consumed is compared against the transceiver power threshold, and the transceiver active duration is compared against the active transceiver time threshold. If any of the transceiver temperature, transceiver power consumed, or transceiver active duration exceeds the respective threshold, a failed compliance event indicating the exceeded threshold is raised.

In one embodiment, where the device fingerprint includes the developer layer having a first threshold for a particular parameter, e.g., an operating temperature threshold for a transceiver temperature parameter, and the silicon layer having a second threshold for the particular parameter, and a measured transceiver temperature exceeds either the first threshold or the second threshold, the failed compliance event is raised indicating the exceeded threshold. In some embodiments, the device fingerprint further includes the normalized layer having a third threshold for the particular parameter. If the transceiver temperature exceeds any of the first threshold, the second threshold, or the third threshold, the failed compliance event is raised indicating the exceeded threshold.

In one embodiment, the processor 160 of the detection circuit 88, or other processor component, handles the failed compliance event based on the failed, or exceeded, threshold. The processor 160, handling the failed threshold, may send a disable signal to the power module 66 causing the processor 130 to disable one or more power connection, may send a power cycle command to the power module 66 causing the processor 130 to power cycle mode thereby cycling at least one power connection of the IoT device 14, may send a disable command to the communications module 70 causing either the communications module 70 or the transceiver 74, or both, to become disabled, and may send a notification to the user indicating the failed compliance event has occurred, and, in some embodiments, further indicating the failed threshold, or some combination thereof.

In one embodiment, the processor 160 of the detection circuit 88, or other processor component, handling the failed compliance event indicating a failed or exceeded threshold of the silicon layer may notify, or otherwise indicate to, the user that the IoT device developer has not followed recommended guidelines from the circuitry manufacturer, that the IoT device developer has misconfigured the software or bypassed security steps outlined in the silicon layer, or that features of the circuitry are improperly used by the developer.

In some embodiments, the IoT device 14 can be made by storing a device profile and/or a plurality of device fingerprints within the memory 54, 134, or 164 of the IoT device 14. Each of the device fingerprints have a predetermined operation identifier, and a plurality of measured system parameters indicative of proper operation of at least one component (the processor 50, the memory 54, the timer 58, the user interface 62, the power module 66, the communications module 70 having one or more transceiver 74, the sensor 80, the control device 84, or the detection circuit 88) of the IoT device 14 during or after the occurrence of a predetermined operation. Computer executable logic is stored within the detection circuit 88 of the IoT device 14. The computer executable logic is operable to read the predetermined operation identifier identifying the predetermined operation, access a device fingerprint stored within the non-transitory memory 54, 134 or 164 with the predetermined operation identifier, measure a plurality of system parameters during or after the occurrence of the predetermined operation to generate measured system parameters, compare at least two of the measured system parameters against the predetermined system parameters to determine whether the at least one component is functioning properly, and output a signal indicative of the at least one component not functioning properly to disable the at least one component of the IoT device 14. In making the IoT device 14, the physical components (e.g., the processor 50, the memory 54, the timer 58, the user interface 62, the power module 66, the communications module 70 having one or more transceiver 74, the sensor 80, the control device 84, or the detection circuit 88) of the IoT device 14 can be coupled together and placed within the housing 100 prior to or after the device fingerprints are loaded into the memory 54, 134 or 164, and the computer executable logic is stored within the detection circuit 88. Further, updated device fingerprints and/or computer executable logic can be provided into the memory 54, 134 or 164, and/or the detection circuit 88 after the IoT device 14 has been placed in use.

In use, at least one component of the IoT device 14 is enabled to perform a predetermined operation, to monitor a plurality of system parameters of the at least one component of the IoT device 14 during or after an occurrence of the predetermined operation; and to store the plurality of system parameters as measured system parameters in a device fingerprint in a non-transitory memory 54, 134 or 164 associated with a predetermined operation identifier identifying the predetermined operation. Enabling the device 14 to perform the predetermined operation and the other steps can be accomplished by providing power to the power module 66, turning the IoT device 14 on using the user interface 62, or selecting the predetermined operation to be performed through the user interface 62.

In one embodiment, the computer executable logic is operable to perform the predetermined operation and the other steps at one or more instance in time. For example, the computer executable logic is operable to perform the predetermined operation and the other steps at a first instance in time, a second instance in time different from the first instance in time by a first time period, and a third instance in time different from the second instance in time by a second time period. The first time period and the second time period may be the same or different time periods. Thus, the computer executable logic is operable to perform the predetermined operation and the other steps after a predetermined period of time or after a random period of time.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:
1. An Internet of Things device comprising:
a communication module having circuitry operable to communicatively connect to a network;
a memory operable to store a device fingerprint having a plurality of predetermined system parameters, the predetermined system parameters being secondary indicators that a predetermined operation is being properly taken;
a processor coupled to the memory and operable to execute instructions stored in the memory; and
an activity module, including at least one of a sensor and a control device, the activity module operating under control of the processor, to perform the predetermined operation with at least one of the sensor and the control device, the activity module further operable to communicate on the computer network via the communications module, wherein the processor is further operable to measure system parameters during performance of the predetermined operation, and compare measured system parameters to the predetermined system parameters of the device fingerprint, and to disable at least one of the communications module, the processor, or the activity module responsive to at least two of the measured system parameters being out of compliance with the predetermined system parameters.

2. The Internet of Things device of claim 1, further comprising a power module having a power connection, and wherein disabling the at least one of the communications module, the processor, or the activity module includes disabling the power connection to the at least one of the communications module, the processor, or the activity module.

3. The Internet of Things device of claim 1, further comprising a power module having a processor, and wherein disabling the at least one of the communication modules, the processor, or the activity module includes issuing a power cycle command.

4. The Internet of Things device of claim 1, wherein disabling the communications module includes sending a disable command to the communications module to disable the communications module.

5. The Internet of Things device of claim 1, wherein the predetermined system parameters are selected from a group consisting of a processing time parameter, a power consumption parameter, a radio emissions parameter, and a system bus access parameter.

6. The Internet of Things device of claim 1, wherein the processor measures system parameters in real-time during performance of the predetermined operation by the activity module.

7. The Internet of Things device of claim 6, wherein the processor system parameters continuously.

8. The Internet of Things device of claim 6, wherein the processor system parameters periodically.

\* \* \* \* \*